Oct. 16, 1962 F. M. SULLIVAN 3,058,757
GRIME DEFLECTOR FOR VEHICLES
Filed Sept. 26, 1960
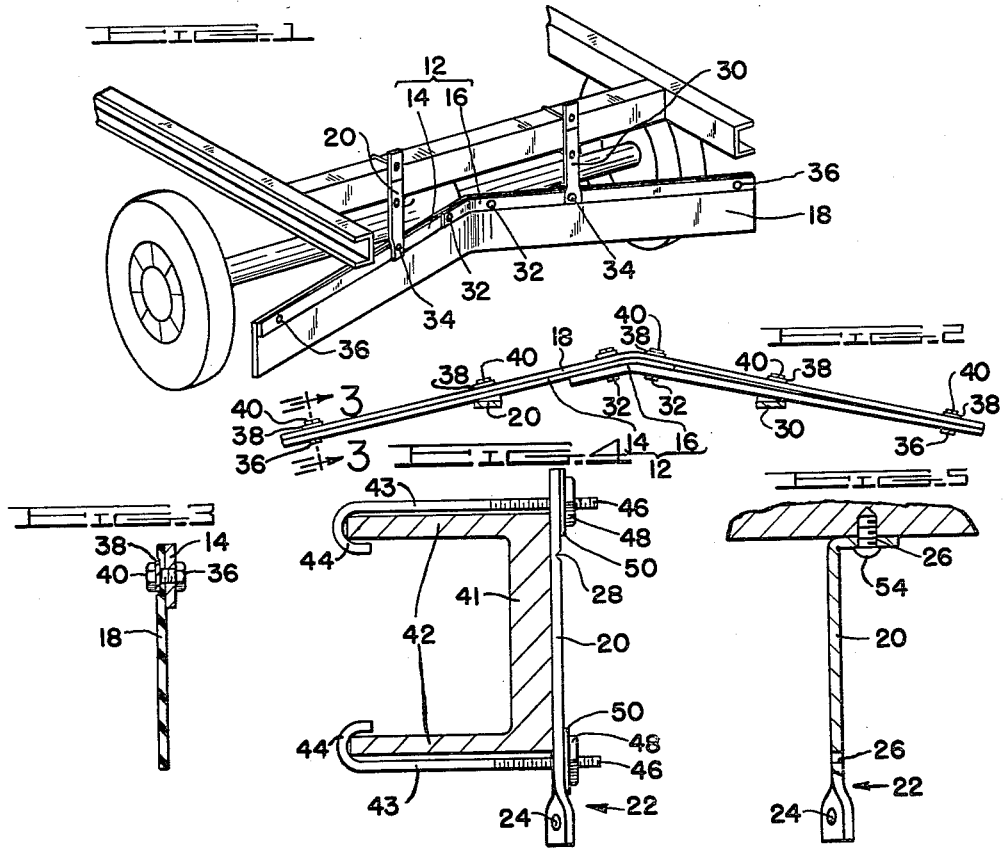
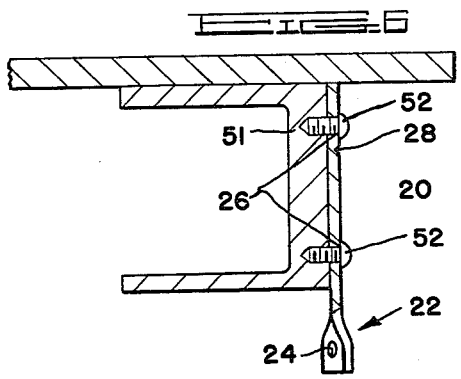
INVENTOR.
FRANCIS M. SULLIVAN
BY Ross W. Campbell
ATTORNEY United States Patent Office 3,058,757
Patented Oct. 16, 1962

3,058,757
GRIME DEFLECTOR FOR VEHICLES
Francis M. Sullivan, 8087 Haviland Drive, Linden, Mich.
Filed Sept. 26, 1960, Ser. No. 58,433
3 Claims. (Cl. 280—159)

This invention relates to a grime deflector and more particularly to a V-shaped grime and air flow deflector for use with a motor vehicle.

Generally, the present invention consists of an elongated, V-shaped support member extending substantially the width of a motor vehicle, suspended horizontally with the apex thereof pointing forward toward the front of the vehicle, below the frame and rearward of the rear axle thereof by a pair of spaced, parallel, vertical, twisted brackets, and supporting an elongated, horizontal, flexible baffle connected along its upper edge to the forward side of said horizontal V-shaped rod by a plurality of nuts and bolts, to depend therefrom rearward of the rear wheels of the vehicle, forward of the discharge port of the exhaust pipe, and in spaced, parallel relationship with the ground.

Heretofore, relatively narrow flexible flaps have been utilized rearwardly of the wheels of motor vehicles as baffles to engage grime and debris, such as stone, other small objects, water, dirt, snow and mud thrown upward and rearward by the wheels of the vehicle, particularly trucks bearing dual tires, for the protection of other, closely following vehicles. Also, straight, horizontal baffles have been suspended across the width of motor vehicles rearward of the rear wheels thereof for the same purpose. The latter type of device also engages grime and debris raised from the road surface by the passage of the vehicle thereover. Both types of devices, however, merely retard the rearward velocity of such debris and deflect downward the rearward path thereof, allowing substantially all such loose grime and debris to pass rearwardly beneath the vehicle across substantially the entire width of the vehicle.

The rearward flow of air over the top, along the sides and under the bottom side of a motor vehicle in motion on a road surface creates an area of relatively low pressure, or partial vacuum, immediately behind and extending substantially the entire width and height of the rear surface of the moving vehicle. The effect of this partial vacuum is to draw upward within said partial vacuum area the loose grime passing rearwardly beneath the vehicle and the exhaust fumes expelled from the tail pipe.

The grime thus drawn upward into the air space of low pressure immediately behind the vehicle tends to attach to the rear surface of the vehicle, soiling same and obscuring visibility through the rear windows of the vehicle. In the case of station wagons, trucks having an open bed, and other vehicles having a compartment with an unclosed opening at the rear, some of this upwardly-drawn grime enters the interior of the vehicle passenger or cargo compartment from the rear and adheres to the inner surfaces thereof and to the passengers and cargo therein. Similarly, noxious exhaust fumes expelled from the tail pipe, including dangerously toxic products of partial combustion such as carbon monoxide, are drawn into the interior of the vehicle from the rear.

It is accordingly an object of my invention to provide a forwardly-pointing, V-shaped grime deflector for a motor vehicle to divert outwardly at the rear of the vehicle and away from the low pressure area created immediately to the rear of the vehicle when in motion by the passage of air over the top and around the sides thereof, grime and debris raised from the road surface beneath the vehicle by the passage of the vehicle thereover and by the wheels of the vehicle, to prevent such grime and debris from being drawn into the said low pressure area.

A further object of my invention is to provide twisted bracket means for supporting a V-shaped grime deflector below the frame of a motor vehicle, rearward of the rear axle and substantially across the entire width thereof, with the apex of the V-shaped grime deflector pointing in the direction of motion of the vehicle.

Still a further object of my invention is to provide in bracket means for supporting a forwardly-pointing V-shaped grime deflector below the frame and rearward of the rear axle of a motor vehicle, hook means for attaching the upper portion of each bracket to a pair of forwardly disposed flanges of a horizontal channel frame member of said motor vehicle.

Still a further object of my invention is to provide in a bracket for supporting a forwardly-pointing, V-shaped grime deflector below the frame and rearward of the rear axle of a motor vehicle, adaptable means for attachment of the upper portion of said bracket to said motor vehicle in a variety of modes.

Still a further object of my invention is to provide a forwardly-pointing, V-shaped baffle to divert outwardly at the rear of the vehicle the flow of air passing beneath said vehicle when in forward motion, to prevent the formation of an area of partial vacuum behind said vehicle and to prevent the drawing of exhaust fumes into said vehicle through rear openings therein.

These, together with various auxiliary features and objects of the invention which will become apparent in the following description, are attained by the present invention, preferred embodiments of which have been illustrated, by way of examples only, in the accompanying drawings, forming a part of this specification, and in which like characters are employed to designate like parts throughout the same, wherein:

FIGURE 1 is a perspective view of a grime deflector attached to a horizontal channel frame member of a motor vehicle.

FIGURE 2 is a plan view of a grime deflector.

FIGURE 3 is a sectional view in elevation taken on line 3—3 of FIGURE 2.

FIGURE 4 is a side elevation, partly in section, of a bracket and bracket hooks attached to a channel member.

FIGURE 5 is a partial sectional view in elevation of a bracket attached to a unified body of a motor vehicle.

FIGURE 6 is a partial sectional view in elevation of a bracket attached to a horizontal frame member by screw means.

Referring now more particularly to the drawings, a horizontal, V-shaped support bar 12 is formed by joining in overlapping and extension relationship a pair of elongated metal bars 14 and 16 of rectangular cross-section, each previously bent near one end thereof so that, when thus joined, they form V-shaped support bar 12 having arms of equal length relatively disposed at an internal angle of approximately 157 degrees. The distance between the remote ends of horizontal, V-shaped support bar 12 is substantially equal to the width of the vehicle to which the grime deflector is to be attached.

I have found that it is not necessary that the remote ends of the grime deflector extend completely across the rear of the rear tires of the vehicle to which the device is attached, it being generally sufficient if the said ends extend approximately to points directly rearward of the center of the treads of the outermost pair of rear tires, respectively, of the vehicle. The device is not, however, rendered inoperative, but merely less efficient, if the distance between the remote ends of support bar 12, and hence of the grime deflector, is substantially less than that between the centers of the outermost pair of rear tires. I have accordingly found it most convenient to construct V-shaped support bar 12 so that the distance between the remote ends thereof is 58.75 inches, approximately equal to the distance between the centers of the treads of the rear tires of most conventional station wagons. I have also found it most convenient to form bars 14 and 16 of a length of 31½ inches each, with a 3 inch overlap at their mutual joint, for convenience in construction and packaging.

An elongated piece of flexible material, such as rubber belting, approximately 60 inches in length and approximately 10 inches in width, is utilized to form horizontally-extending, V-shaped baffle 18. The width of this piece of flexible material should, of course, be selected so as to provide a baffle 18 having a vertical dimension appropriate to the particular vehicle to which the grime deflector is to be attached. I have found it most convenient to provide a baffle 18 having a vertical dimension of 10 inches for use with a station wagon.

Bracket 20 is formed from an elongated metal bar of rectangular cross-section and twisted counter-clockwise near the lower end thereof at an angle of approximately 11.5 degrees, as at 22. A hole 24 is drilled in the lower portion of bracket 20, below twist 22, and a pair of holes 26 are drilled in the upper portion of bracket 20 above twist 22. Notch 28 is formed in the rear side of bracket 20 intermediate holes 26 and near the upper of said holes. A second bracket 30 is provided, identical to bracket 20 with the exception of the direction of twist 22 which, while of identical extent, is clockwise in direction.

To assemble the grime deflector, a pair of bolts 32 are forwardly-inserted, respectively, through pairs of mating holes drilled in the short, bent portions of elongated rectangular bars 14 and 16, respectively, to retain bars 14 and 16 in overlapping, extension relationship. A second pair of bolts 34 are forwardly inserted, respectively, through holes 24 of brackets 20 and 30, respectively, and through a pair of holes drilled, respectively, in bars 14 and 16, equidistant from the apex of V-shaped support bar 12. Bracket 20, having a counterclockwise twist, is attached to bar 14, and bracket 30, having a clockwise twist, is attached to bar 16, so that when the grime deflector is mounted on a motor vehicle with the apex of the angle between bars 14 and 16 pointed in the direction of motion of the motor vehicle, the forward faces of the upper portions of brackets 20 and 30, above the approximately 11.5 degree twist therein, will also face in the direction of motion of the vehicle.

A plurality of additional holes are drilled in elongated, V-shaped support bar 12 and additional bolts 36 are inserted therethrough from the rear thereof.

A plurality of parallel, horizontal holes are drilled through baffle 18 near the upper edge thereof to receive bolts 32, 34 and 36 which are then inserted therethrough. Washers 38 and nuts 40 are then, in turn, placed on bolts 32, 34 and 36, and nuts 40 are then tightened. Baffle 18 is thus drawn into a V-shaped form to complete the assembly of the V-shaped grime deflector.

The resiliency of baffle 18 maintains tension on nuts 40 and prevents loosening thereof from vibration. Further, the resiliency of baffle 18 protects V-shaped support bar 12 from damage by stones and other objects thrown rearward by the wheels of the vehicle.

Since frame structure varies among motor vehicles, I provide in my invention several modes by which brackets 20 and 30 may be attached to motor vehicles. Where the frame structure of the motor vehicle includes a horizontal channel member 41 disposed rearward of the rear axle of the vehicle, spaced below the underside of the deck of the vehicle, and with the flanges 42 of the channel member directed toward the forward part of the vehicle, I provide a pair of hook rods 43 each bearing a hook 44 at one end thereof, the other ends 46 thereof being threaded to receive nuts 48. Hook rods 43 are positioned, respectively, along the outer sides of the forwardly-directed flanges 42 of channel member 41 with hooks 44 extending around the forward edges of flanges 42, respectively, toward the inside of the channel, as illustrated in FIGURE 4. The threaded ends 46 of hooks 42 are then inserted through holes 26 in brackets 20 and 30, respectively, washers 50 placed thereon, and nuts 48 threadably engaged therewith and tightened thereon to secure brackets 20 and 30 in contact with the rear of channel member 41 and in mutual, parallel disposition, spaced by the height of channel member 41, thereby firmly gripping flanges 42 of channel member 41 at the respective forward edges thereof. The grime deflector is thus attached to the motor vehicle and suspended rearward of the rear axle thereof. The apex of the angle formed in support bar 12 and baffle 18 points toward the front of the vehicle and the grime deflector extends substantially the entire width of the vehicle behind the rear wheels thereof and in spaced, parallel relationship with the road surface. Brackets 20 and 30 are formed of such a length as to suspend the grime deflector at the proper height to prevent the passage of grime and debris over the top of the grime deflector. Grime raised from the road surface by the passage of the motor vehicle, or thrown backward and upward by the wheels of the vehicle, and air flowing rearward beneath the vehicle when in motion, strike the forward surface of V-shaped baffle 18 and are deflected outward and to the rear through the space between the nearest rear wheel of the vehicle and the nearest end of the grime deflector.

Where a horizontal rear frame member 51 is disposed flush against the underside of the deck of the motor vehicle, brackets 20 and 30 may be attached to frame member 51 by a pair of machine screws 52 inserted through holes 26 respectively and threadably engaged in a pair of holes drilled in said channel member 51, as illustrated in FIGURE 6.

Where the motor vehicle is constructed with a unitized frame, or integral frame and body, brackets 20 and 30 may be bent backward at notch 28 to form a right angle at the upper end of each said bracket, the short horizontal arm of which may be attached to the underside of the unitized body of the vehicle by machine screws 54 passing through aperture 26 in said horizontal arm and threaded within a hole drilled in the underside of said unitized body, as illustrated in FIGURE 5.

While I have shown and described the preferred embodiment of my invention as having an interior angle of approximately 157 degrees with brackets each having a twist of approximately 11.5 degrees, one-half of the complement of such interior angle, it is to be understood that my invention is not limited in this respect and that the device may be constructed with any convenient interior angle and with brackets having any convenient degree of twist.

What is claimed is:

1. A grime deflector for a road vehicle having a rear axle and a horizontal channel frame member across the rear of said vehicle rearward of said rear axle, the flanges of said horizontal channel member being parallel to the road surface and directed toward the front of said vehicle, comprising, a pair of elongated bars of substantially rectangular cross-section connected in overlapping relationship to form an elongated, horizontal, V-shaped support bar extending substantially across the width of said vehicle; an elongated, horizontal flexible, V-shaped skirt attached along its upper edge to the forward side of said support bar along substantially the entire length thereof by a plurality of bolts extending forwardly through said support bar, and having a washer surrounding each bolt, respectively, in contact with said skirt on the forward side thereof, and a nut securing each said bolt and washer, to form an elongated, horizontally-disposed, V-shaped baffle; a pair of elongated, rectangular rods in spaced, parallel, vertical arrangement, having a twist clockwise and counter-clockwise, respectively, therein near the lower end thereof, each rod having a plurality of holes therein and a notch on the rear side near the upper end thereof, each attached below said twist to said support bar and attached above said twist to said horizontal frame member of said vehicle by a pair of forwardly-extending frame hooks, the hooks of which grasp, respectively, the forward edges of the flanges of said channel member, the other end of each frame hook being threaded and passing through a hole in said brackets, respectively, above said twists, and retained by a nut threaded on each said frame hook rearward of said bracket, to form a pair of hooked brackets supporting said support member and baffle below the frame of said vehicle, in spaced, parallel relationship with the road surface, with the apexes of said support bar and baffle pointed toward the front of said vehicle.

2. A grime deflector for a road vehicle having a rear axle and a horizontal channel frame member across the rear of said vehicle rearward of said rear axle, the flanges of said horizontal channel member being parallel to the road surface and directed toward the front of said vehicle, comprising, a pair of elongated bars of substantially rectangular cross-section connected in overlapping relationship to form an elongated, horizontal, V-shaped support bar extending substantially across the width of said vehicle; an elongated, horizontal flexible, V-shaped skirt attached along its upper edge to the forward side of said support bar along substantially the entire length thereof, to form an elongated, horizontally-disposed, V-shaped baffle; a pair of elongated, rectangular rods in spaced, parallel, vertical arrangement, having a twist clockwise and counter-clockwise, respectively, therein near the lower end thereof, each attached below said twist to said support bar and attached above said twist to said horizontal frame member of said vehicle by a pair of forwardly-extending frame hooks the hooks of which grasp, respectively, the forward edges of the flanges of said channel member, the other end of each frame hook being threaded and passing through a hole in said brackets, respectively, above said twists, and retained by a nut threaded on each said frame hook rearward of said bracket, to form a pair of hooked brackets supporting said support member and baffle below the frame of said vehicle, in spaced, parallel relationship with the road surface, with the apexes of said support bar and baffle pointed toward the front of said vehicle.

3. A grime deflector for a road vehicle having a rear axle and a horizontal channel frame member across the rear of said vehicle rearward of said rear axle, the flanges of said horizontal channel member being parallel to the road surface and directed toward the front of said vehicle, comprising, a pair of elongated bars of substantially rectangular cross-section connected in overlapping relationship to form an elongated, horizontal, V-shaped support bar extending substantially across the width of said vehicle; an elongated, horizontal flexible, V-shaped skirt attached along its upper edge to the forward side of said support bar along substantially the entire length thereof, to form an elongated, horizontally-disposed, V-shaped baffle; a pair of elongated, rectangular rods in spaced, parallel, vertical arrangement, having a twist clockwise and counter-clockwise, respectively, therein near the lower end thereof, each rod having a plurality of holes therein and a notch on the rear side near the upper end thereof, each attached below said twist to said support bar and attached above said twist to said horizontal frame member of said vehicle by a pair of forwardly-extending frame hooks the hooks of which grasp, respectively, the forward edges of the flanges of said channel member, the other end of each frame hook being threaded and passing through a hole in said brackets, respectively, above said twists, and retained by a nut threaded on each said frame hook rearward of said bracket, to form a pair of hooked brackets supporting said support member and baffle below the frame of said vehicle, in spaced, parallel relationship with the road surface, with the apexes of said support bar and baffle pointed toward the front of said vehicle.

References Cited in the file of this patent

UNITED STATES PATENTS

| | | |
|---|---|---|
| 789,250 | Bastian | May 9, 1905 |
| 843,072 | Collier | Feb. 5, 1907 |
| 1,470,244 | Piper | Oct. 9, 1923 |
| 1,485,283 | Maxwell | Feb. 26, 1924 |
| 1,542,769 | Henry | June 16, 1925 |
| 1,919,568 | McCosh | July 25, 1933 |
| 1,930,376 | Willett | Oct. 10, 1933 |
| 2,777,710 | Panchesine | Jan. 15, 1957 |

FOREIGN PATENTS

| | | |
|---|---|---|
| 680,364 | France | Jan. 18, 1930 |
| 373,569 | Great Britain | May 26, 1932 |